US010018977B2

(12) United States Patent
Cipollo et al.

(10) Patent No.: US 10,018,977 B2
(45) Date of Patent: Jul. 10, 2018

(54) HISTORY-BASED KEY PHRASE SUGGESTIONS FOR VOICE CONTROL OF A HOME AUTOMATION SYSTEM

(71) Applicant: Savant Systems, LLC, Hyannis, MA (US)

(72) Inventors: Nicholas J. Cipollo, Boston, MA (US); Ryan E. Kitson, Brooklyn, NY (US); George T. Katsiris, Chatham, MA (US)

(73) Assignee: Savant Systems, LLC, Hyannis, MA (US)

( * ) Notice: Subject to any disclaimer, the term of this patent is extended or adjusted under 35 U.S.C. 154(b) by 366 days.

(21) Appl. No.: 14/875,210

(22) Filed: Oct. 5, 2015

(65) Prior Publication Data
US 2017/0097618 A1 Apr. 6, 2017

(51) Int. Cl.
*G01M 1/38* (2006.01)
*G05B 15/02* (2006.01)
(Continued)

(52) U.S. Cl.
CPC .............. *G05B 15/02* (2013.01); *G10L 15/22* (2013.01); *G10L 17/22* (2013.01);
(Continued)

(58) Field of Classification Search
None
See application file for complete search history.

(56) References Cited

U.S. PATENT DOCUMENTS 5,454,063 A * 9/1995 Rossides ........... G06F 17/30988
704/270
6,513,006 B2   1/2003 Howard et al.
(Continued)

OTHER PUBLICATIONS

Ma, Tinghuai, et al., "Context-Aware Implementation based on CBR for Smart Home," Wireless and Mobile Computing, Networking and Communications, (WIMOB' 2005), IEEE International Conference on Montreal, Canada, Piscataway, New Jersey, US, vol. 4, Aug. 22-24, 2005, pp. 112-115.
(Continued)

*Primary Examiner* — Adam Lee
(74) *Attorney, Agent, or Firm* — Cesari and McKenna, LLP; James A. Blanchette (57) ABSTRACT

In one embodiment, history-based key phrase suggestions are provided for voice control of a home automation system. A host controller builds a history database that maintains a history of events, each event indicating one or more services activated, one or more scenes activated or one or more types of media content presented by the home automation system. A predictions process on the host controller selects a subset of the events of the history database based on a present condition of the home automation system to produce a predication dataset. A grammar process on a remote control or mobile device selects one or more intentions from a list used by a voice recognition engine, based on the prediction dataset. Each intention includes a key phrase paired with an action. A voice user interface (UI) process suggests key phrases from the one or more selected intentions in a voice control UI on the remote control or mobile device.

18 Claims, 7 Drawing Sheets

(51) Int. Cl.
*G10L 17/22* (2013.01)
*H04L 12/28* (2006.01)
*G10L 15/22* (2006.01)

(52) U.S. Cl.
CPC ...... *H04L 12/2803* (2013.01); *H04L 12/2816* (2013.01); *G10L 2015/223* (2013.01); *G10L 2015/225* (2013.01); *G10L 2015/228* (2013.01)

(56) References Cited

U.S. PATENT DOCUMENTS

| | | | | |
|---|---|---|---|---|
| 6,792,319 | B1* | 9/2004 | Bilger | G05B 15/02 700/12 |
| 7,177,817 | B1* | 2/2007 | Khosla | G10L 15/22 704/257 |
| 8,332,218 | B2 | 12/2012 | Cross et al. | |
| 8,825,020 | B2 | 9/2014 | Mozer et al. | |
| 8,831,957 | B2 | 9/2014 | Taubman et al. | |
| 9,153,125 | B2 | 10/2015 | Madonna et al. | |
| 2003/0105637 | A1* | 6/2003 | Rodriguez | G06F 17/2735 704/270 |
| 2007/0143801 | A1 | 6/2007 | Madonna et al. | |
| 2013/0283025 | A1 | 10/2013 | Madonna et al. | |
| 2014/0277753 | A1* | 9/2014 | Eiynk | G05B 15/02 700/275 |
| 2015/0053781 | A1* | 2/2015 | Nelson | F24F 11/006 236/10 |
| 2015/0084742 | A1 | 3/2015 | Madonna et al. | |
| 2015/0127174 | A1* | 5/2015 | Quam | F24F 11/0086 700/276 |
| 2015/0162006 | A1* | 6/2015 | Kummer | G07O 9/00571 704/275 |
| 2015/0241860 | A1* | 8/2015 | Raid | G05B 15/02 700/275 |
| 2015/0254057 | A1* | 9/2015 | Klein | G06F 3/167 704/275 |
| 2015/0254058 | A1* | 9/2015 | Klein | G06F 3/167 704/275 |
| 2015/0309484 | A1* | 10/2015 | Lyman | G05B 13/0205 700/275 |
| 2015/0324706 | A1* | 11/2015 | Warren | G05B 15/02 700/275 |
| 2015/0325096 | A1* | 11/2015 | Hatch | F24F 11/001 340/601 |
| 2015/0331666 | A1* | 11/2015 | Bucsa | G10L 15/30 704/275 |
| 2015/0341184 | A1 | 11/2015 | Tatzel et al. | |
| 2015/0341389 | A1* | 11/2015 | Kurakami | H04L 63/20 726/1 |
| 2016/0092157 | A1* | 3/2016 | Kalkere | G05B 15/02 700/94 |
| 2016/0124401 | A1* | 5/2016 | Li | G05B 15/02 700/275 |
| 2016/0182247 | A1* | 6/2016 | Cregg | H04L 12/282 700/9 |
| 2016/0277203 | A1* | 9/2016 | Jin | G05B 15/02 |
| 2016/0314782 | A1* | 10/2016 | Klimanis | G10L 15/065 |
| 2016/0316293 | A1* | 10/2016 | Klimanis | H04L 12/2803 |
| 2017/0004828 | A1* | 1/2017 | Lee | G10L 25/63 |

OTHER PUBLICATIONS

"Notification of Transmittal of the International Search Report and the Written Opinion of the International Searching Authority, or the Declaration," International Filing Date: Oct. 4, 2016, International Application No. PCT/US2016/055281, Applicant: Savant Systems, LLC, dated Jan. 2, 2017, pp. 1-16.

Rashidi, Parise, et al., "Keeping the Resident in the Loop: Adapting the Smart Home to the User," IEEE Transactions on Systems, Man, and Cybernetics—Part A: Systems and Humans, IEEE Service Center, Piscataway, New Jersey, US, vol. 39, No. 5, Sep. 2009, pp. 949-959.

* cited by examiner

| ABC | Help Me | Spotify |
|---|---|---|
| Apple TV | I'm Cold | Vacation |
| Apple TV Live | I'm Hot | Vacation Scene |
| Away | Keypad | Wake Up |
| Away Scene | Lights Off | Wake Up Scene |
| Bluray | Lights On | Warmer |
| Bright | Listen to Apple TV Live | Watch ABC |
| Brighter | Listen to CD | Watch Apple TV |
| CBS | Listen to Radio | Watch Bluray |
| CD | Listen to Satellite Radio | Watch CBS |
| CNN | Listen to Spotify | Watch CNN |
| Cable | Media Player | Watch Cable |
| Cancel Dinner | Mid | Watch ESPN |
| Cancel Goodnight | Monitor | Watch HBO |
| Cancel Play Time | Movie Night | Watch Media Player |
| Cancel Relax | Movie Night Scene | Watch Monitor |
| Cancel Shades | NBC | Watch NBC |
| Cancel Vacation | Play Time | |
| Capture | Play Time Scene | |
| Cooler | Radio | |
| Date Night | Relax | |
| Date Night Scene | Relax Scene | |
| Dim | Satellite Radio | |
| Dimmer | Schedule Dinner | |
| Dinner | Schedule Goodnight | |
| Dinner Scene | Schedule Play Time | |
| ESPN | Schedule Relax | |
| FAVORITES | Schedule Shades | |
| Goodnight | Schedule Vacation | |
| Goodnight Scene | Shades | |
| HBO | Shades Scene | |

HISTORY-BASED KEY PHRASE SUGGESTIONS FOR VOICE CONTROL OF A HOME AUTOMATION SYSTEM

BACKGROUND

Technical Field

The present disclosure relates generally to home automation systems and more specifically to voice control of home automation systems.

Background Information

Home automation systems are becoming increasingly popular in both residential and commercial buildings. Such systems may be capable of controlling, switching data between, and otherwise interacting with a wide variety of devices, including lighting devices, security devices, audio/video (A/V) devices, heating ventilation and cooling (HVAC) devices, and/or other types of devices. Traditionally, home automation systems have provided various types of button-centric or touch screen-based control. More recently, there have been attempts to provide voice control. However various limitations of voice control have hindered its widespread adoption in home automation systems, rendering it more of a curiosity than a direct replacement for button-centric or touch screen-based control.

One problem with voice control is that users are often unsure what to say to the home automation system to produce a desired result. Many voice recognition systems are configured to understand only a limited number of key phrases (a lexicon of key phrases) that are each mapped to control actions. In order to trigger an action, the user must say one of the key phases in the lexicon. Users may be initially taught key phrases via a user manual, tutorial or other sort of training materials. However, over time they may forget the key phrases for certain desired actions and become frustrated when they cannot cause the home automation system to respond in the desired manner. In attempts to address this issue, some home automation systems are configured to provide an on-demand listing of all key phrases. However, the display of the entire lexicon often overwhelms the user, burying information relevant to their present desires among a listing of other key phrases that are largely irrelevant to what they are presently attempting to do.

Accordingly, there is a need for improved techniques for implementing voice control in a home automation system.

SUMMARY

Example techniques are provided to improve voice control in a home automation system by providing history-based key phrase suggestions in a voice control user interface (UI). Such key phrase suggestions may prompt the user regarding speech input that may be appropriate given the user's historic usage pattern. The key phrase suggestions may be of limited number, so as to not overwhelm the user with large amounts of information.

In one example embodiment, host activity recording software on a host controller may build a history database that maintains events that have occurred in the home automation system. Each event may indicate one or more services activated, one or more scenes activated, one or more types of media content presented or other historical information. A predictions process on a host controller of the home automation system may select a subset of the events from the history database based on a present condition of the home automation system (e.g., time) to produce a predication dataset. For example, the predictions process may select events in the history database that occurred on a same day of the week as the present day of week, in a time window that encompasses the present time of day on any day of the week, or in a time window that encompasses the present time of day on a same day of the week as the present day of the week. Voice suggestion software on a remote control or mobile device may select one or more intentions from a list of intentions based on the prediction dataset, wherein each intention includes a key phrase recognized by a voice recognition engine paired with an action performed in the home automation system in response to the key phrase. The voice suggestion software may display a voice control UI on a screen of the remote control or mobile device that presents the key phrases from the one or more selected intentions as key phrase suggestions. In response to such prompt, the user may speak a key phrase. Given this speech input from the user, a voice recognition engine on the remote control or mobile device may compare the speech input against key phrases of the list of intentions to find a matching intention, and trigger the action associated with the matching intention.

It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Definitions

As used herein, the term "home automation system" should be interpreted broadly to encompass various types of home control, "smart home", and/or device control systems that may control devices (e.g., lighting devices, security devices, A/V devices, HVAC devices, electronic door locks, and/or other types of devices) within a structure, such as a residential dwelling or commercial building. A home automation system may control a variety of different types of devices, or devices of only a particular type (e.g., only lighting devices, only A/V devices, etc.).

As used herein, the term "mobile device" refers to an electronic device that executes a general-purpose operating system and is adapted to be transported on one's person. Devices such as smartphones and tablet computers should be considered mobile devices. Desktop computers, servers, or other primarily-stationary computing devices generally should not be considered mobile devices.

As use herein, the term "service" refers to an activity offered by a home automation system that involves interactions between one or more devices of the home automation system. A service may, but need not, define a list of commands and state feedback applicable to the activity.

As used herein, the term "scene" refers to a set of instructions that, when activated, control one or more devices of a home automation system in a predefined manner. A scene may, but need not, be defined during initial configuration of the home automation system.

As used herein, the term "media content" refers to recorded, broadcast and/or streaming audio and/or video. Media content may include a cable or satellite television station, a streaming or broadcast radio station, stored movies or television shows, stored music, and the like.

As used herein, the term "intention" refers to a data structure that is capable of storing a relation between a key phrase recognized by a voice recognition engine and an action performed in response to that key phrase.

An Example Home Automation System

Figure 1:
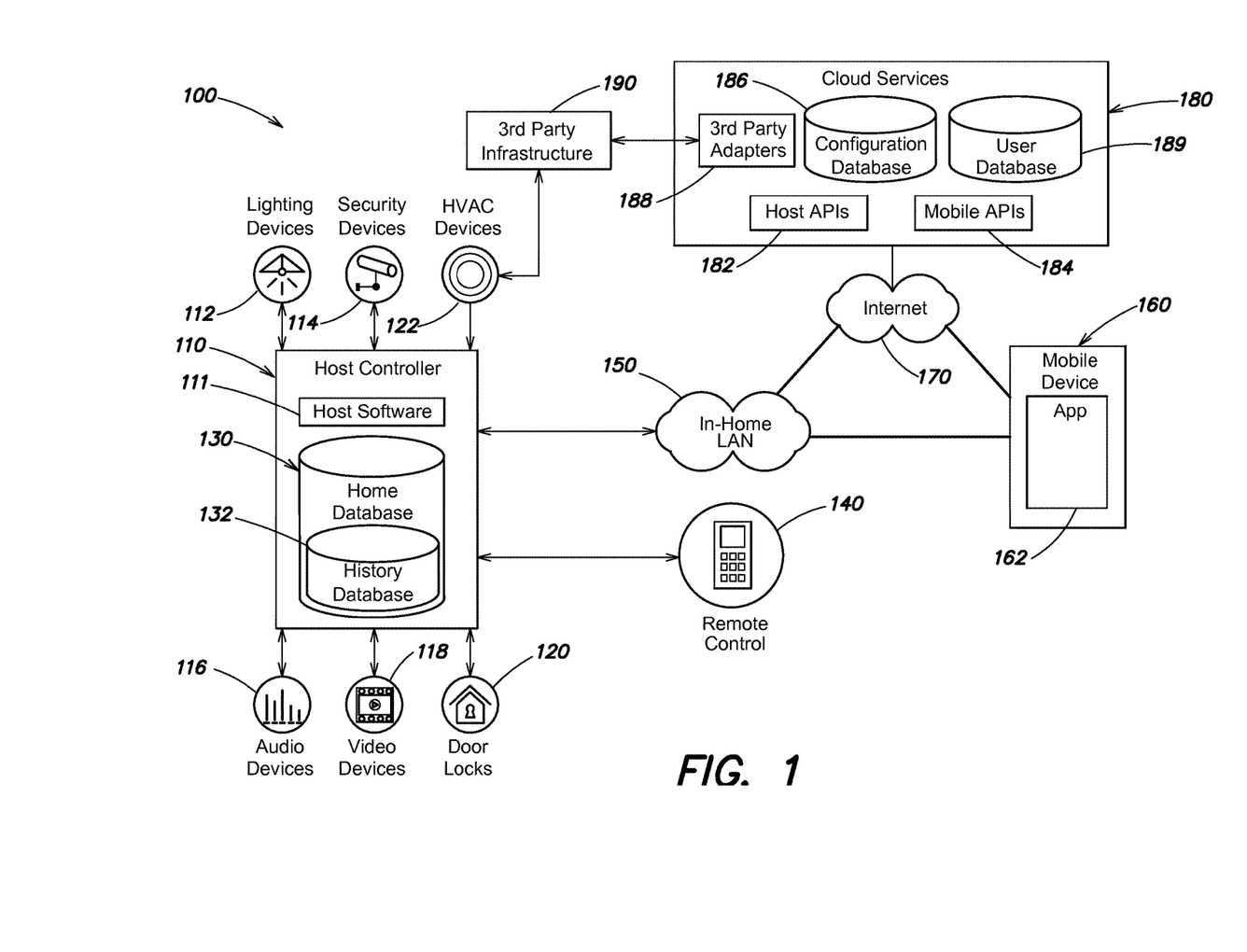
FIG. 1 is a block diagram of an example architecture of a home automation system operable to control devices about a structure.

FIG. 1 is a block diagram of an example architecture 100 of a home automation system operable to control devices about a structure (e.g., a residential dwelling or commercial building). At the core of the system is a host controller 110 coupled to an in-home local area network (LAN) (e.g., a Wi-Fi network) 150. The host controller may include hardware components such as a processor, a memory and a storage device, which collectively store and execute host software 111 configured to monitor the control the operations of devices 112-122, as well as to provide UI interpretation, system administration and monitoring, synchronization with cloud services 180 and mobile devices 160, activity recording, activity prediction and other types of functionality.

The host controller 110 may maintain in its storage device a home database 130 that stores configuration information including services the home automation system is configured to provide, user content such as scenes that are configured for a user of the home automation system, media content associated with a user of the home automation system (e.g., favorites), system state information indicating a present condition of the home automation system, as well as other types of data. The home database 130 may further maintain a record of historical activity in the home automation system. Such portion of the home database may be referred to as a history database 132. It should be understood that in certain alternative embodiments, the history database 132 may be a separate database, rather than a part of the home database 130, and may be maintained in the storage device of the host controller 110, by cloud services 180, or elsewhere.

The devices 112-122 of the home automation system may include lighting devices 112, such as lighting controllers, lamp modules, dimmer modules, switches, keypads, fan controllers and the like; security devices 114, such as home monitors/cameras, motion sensors, home healthcare sensors, related controllers and the like; audio devices 116 and video devices 118 (collectively A/V devices), such as A/V device controllers, infrared (IR) blasters, matrix switchers, media servers, audio amplifiers, cable boxes, and the like; electronic door locks 120 and other types of motor or relay operated devices; HVAC devices 122, such as thermostats; as well as other types of devices.

Depending on the implementation, the communications capabilities of the devices 112-122 of the home automation system may vary. For example, at least some of the devices may include both a LAN interface to enable them to communicate with the host controller 110 and other devices via the in-home LAN 150. Likewise, other devices may only have ports or transceivers for wired or point-to-point wireless communication (e.g., RS-232 ports, infrared (IR) transceivers, relay control ports, general-purpose input/output (GPIO) ports, etc.) and communicate with the host controller 110 and other devices using such ports. Further, some devices may include a LAN interface (e.g., a Wi-Fi interface), but not be configured to communicate with the host controller 110 directly over the in-home LAN 150, but instead communicate first with cloud services 180 via the Internet 170 and third party infrastructure 190. It should be understood that while HVAC devices 122 are shown in FIG. 1 as an example of one type of device that may communicate in this manner, other types of devices 112-122 may alternatively use this method of communication, and vice versa.

A user may control the home automation system using a remote control 140 that communicates with the host controller 110 through the in-home LAN 150 (e.g., via Wi-Fi) or directly with the host controller 110 (e.g. via IR or radio frequency RF signals). The remote control 140 may include hardware components such as a processor, a memory and a storage device, which store and execute software (e.g., an application (app)) configured to interface with the host controller 110 and cloud services 180, generate and display a home automation control UI (including a voice control UI), and recognize user speech input (e.g., using a voice recognition engine), among other functionality. The remote control 140 may further include a display screen (e.g., a touch screen) for showing a home automation control UI (including a voice control UI) and a microphone for receiving the user speech input, among other components.

A user may further control the home automation system using a mobile device 160 that communicates with the host controller 110 via the in-home LAN 150 or using a mobile data connection to the Internet 170. The mobile device 160 may include hardware components such as a processor, a memory and a storage device, which store and execute an app 162 (e.g., a mobile app) configured to interface with the host controller 110 and/or cloud services 180, generate and display a home automation control UI (including a voice control UI), and recognize user speech input (e.g., using a voice recognition engine), among other functionality. The mobile device 160 may further include a display screen (e.g., a touch screen) for showing the home automation control UI (including the voice control UI) and a microphone for receiving the user speech input, among other components.

The host controller 110 and mobile device 160 may communicate via internet 170 with cloud services 180 and host application program interfaces (APIs) 182 and mobile APIs 184. The cloud services 180 may provide remote access to home automation control, a persistent backup of the home database 130 (storing data in a configuration database 186), interfaces to third party infrastructure (via third party adaptors 188), user profiles and usage tracking (storing data in user database 189), a mechanism for over-the-air updates, host crash reporting, and license management, among other functions.

Activity Recording

Figure 2:
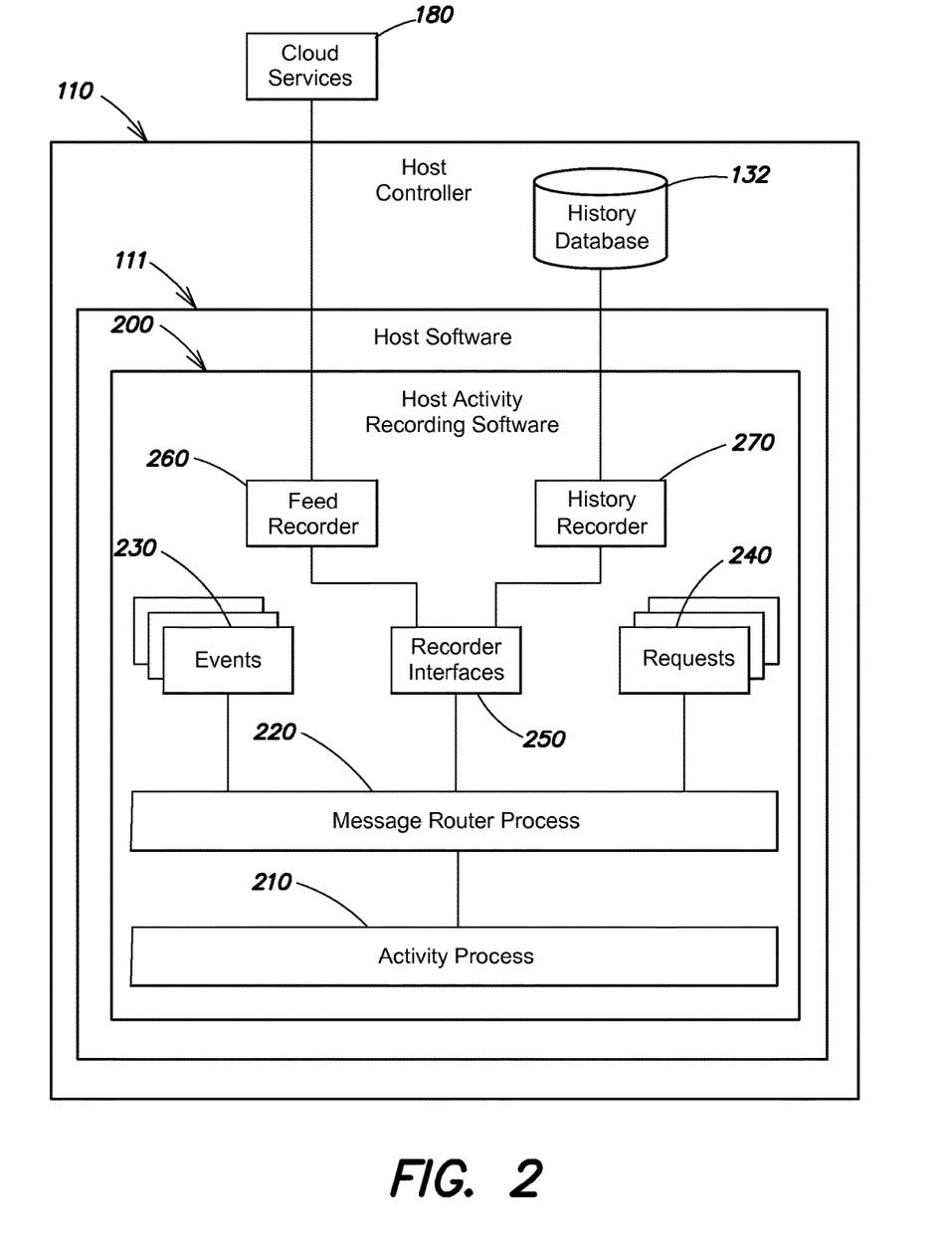
FIG. 2 is a block diagram showing example host software, including host activity recording software, that may maintain a record of historical activity in a home automation system as events in a history database.

FIG. 2 is a block diagram showing example host software 111, including host activity recording software 200, that may maintain a record of historical activity in a home automation system as events in a history database 132. The software 200 may include an activity process 210 that receives massages via inter-process communication (IPC) from other software (e.g., on the host controller 110) regarding services activated, scenes activated, media content presented by the home automation system, and the like. The activity process 210 may pass these messages along to a message router process 220. The activity process 210 may receive back from the message router process 220 responses to requests regarding activity in the home automation system. The activity process 210 may pass these responses on to other software, such a predictions process, as discussed further below.

The message router process 220 performs several function including transforming massages from the activity process 210 into events 230, routing events 230 to recorder interfaces 250, and routing responses to requests back to the activity process 210. Events 230 are objects that maintain information describing historical activity in the home automation system including services activated, scenes activated, types of media content presented, and the like. Each event 230 may include a user property that indicates the user that triggered the event, a type property that describes the type of the event, a group key that groups similar types of events together, a service property that describes a service activated (or is null if the event does not involve a service), a time property that indicates a time the event occurred (including day of week and time of day), and an arguments property that stores additional information.

Requests 240 are objects that represent queries for data from client processes regarding activity in the home automation system that may be available from recorders 260-270. One client process that may issue a request 240 is a predictions process, as discussed in more detail below.

Recorder interfaces 250 may provide interfaces to recorder processes, such as a feed process 260 and a history process 270, that accept events 230 and requests 240, among other uses. The feed process 260 may generate an activity feed that provides a brief history of events 230 in the home automation system and passes this along to cloud services 180. The history process 270 may store events 230 in the history database 132, logging properties including, user, type, group key, service, time and arguments.

Voice Control

As discussed above, the home automation system may be voice controlled such that, in response to speech input, a corresponding user interface action is triggered. Such voice control may be implemented by a voice recognition engine that is configured to recognize a limited number of key phrases that are each associated with an action in the home automation system (e.g., to activate a service, activate a scene, present media content, etc.).

Figure 3:
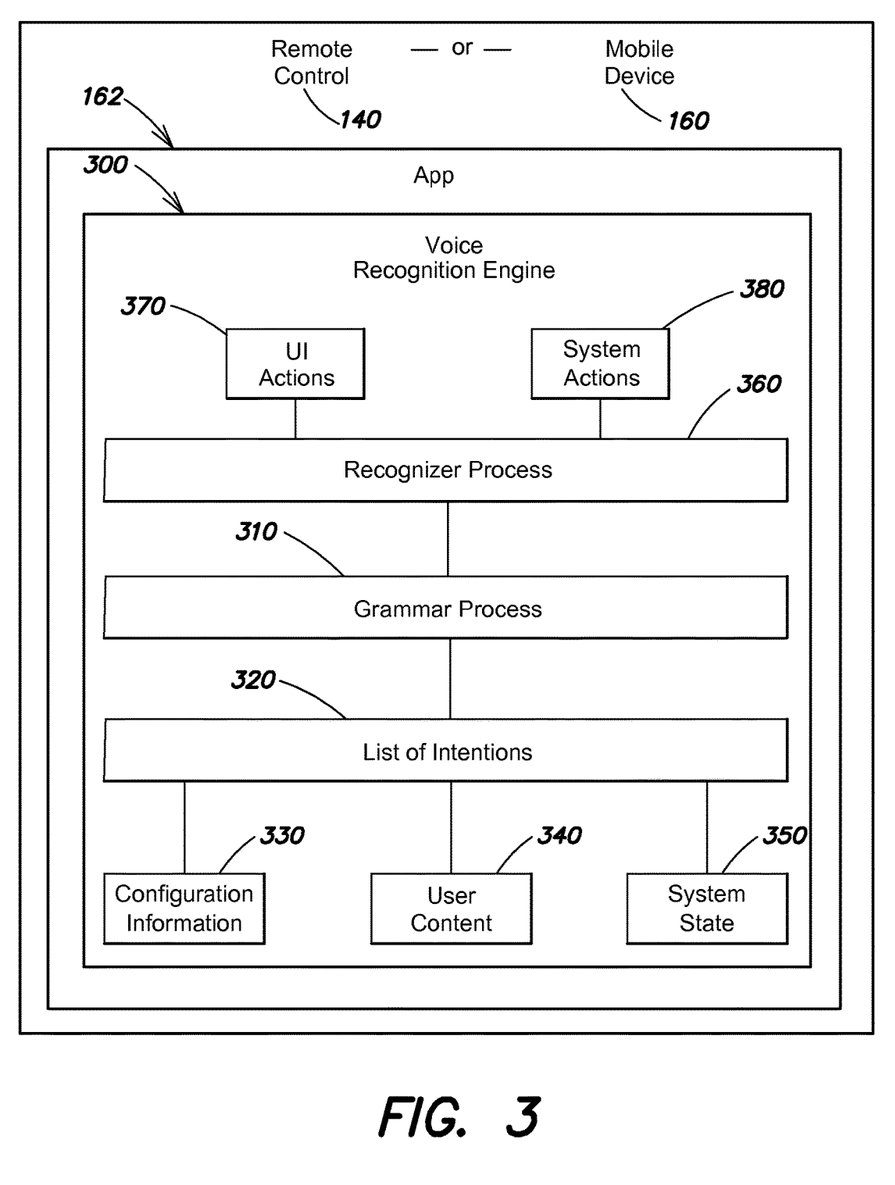
FIG. 3 is a block diagram showing an example app, including a voice recognition engine, that may be executed on a remote control or mobile device.

FIG. 3 is a block diagram showing an example app 162, including a voice recognition engine 300, that may be executed on a remote control 140 or mobile device 160. The voice recognition engine 300 may include a grammar process 310 that performs a variety of different functions. One function of the grammar process 310 may be to build a list of intentions 320 (e.g., structured as an intention lookup table). Each intention includes a key phrase that is recognized by the voice recognition engine paired with an action performed by the home automation system in response to the key phrase. The actions may include UI actions 370 that control one or more aspects of the home automation system control UI, and system actions 380 that control services, scenes, media content, or other operations of the home automation system. The list of intentions 320 may be built dynamically using data obtained from the home database 130. The data may include configuration information 330, such as indications of services the home automation system is configured to provide; user content 340, such as scenes defined in the home automation system or media content (e.g., favorites) associated with a user; and system state 350, such as indications of active services. The dynamic building may be tailored to the identity of the current user and a room of the structure in which the user is located (e.g., based on a dynamically determined location of the remote control 140 or mobile device 160 as in a particular room or a binding of the remote control 140 or mobile device 160 to a particular room). The dynamic building may add intentions to the list that are relevant to the current configuration information 330, user content 340, system state 350, user and room, while omitting intentions that are inapplicable (e.g., intentions for services that are not presently configured in the room, for scenes that are not defined in the room, for user content that is not a favorite of the current user, for operating conditions other than the present system state, etc.). The grammar process 310 may continually monitor configuration information 330, user content 340, system state 350, user and room, and rebuild the list of intentions as needed. To improve efficiency, only those portions of the list of intentions that are affected by a change may be rebuilt (e.g., a partial update).

Another function the grammar process 310 may perform is to validate the key phrases of the intentions to ensure they are recognizable by a recognizer process 360. Intentions whose key phrases are not validated may be pruned out of the list of intentions. Once validated, the grammar process 310 may output the intentions to the recognizer process 360. The recognizer process 360 may compare speech input (e.g., received via a microphone of the remote control 140 or mobile device 160) with key phrases of the list of intentions, and trigger the corresponding action upon a match.

Still further, as discussed in more detail below, the grammar process 310 may also play a role in selecting intentions whose key phrases are to be displayed as key phrase suggestions in a voice control UI.

Figure 4:
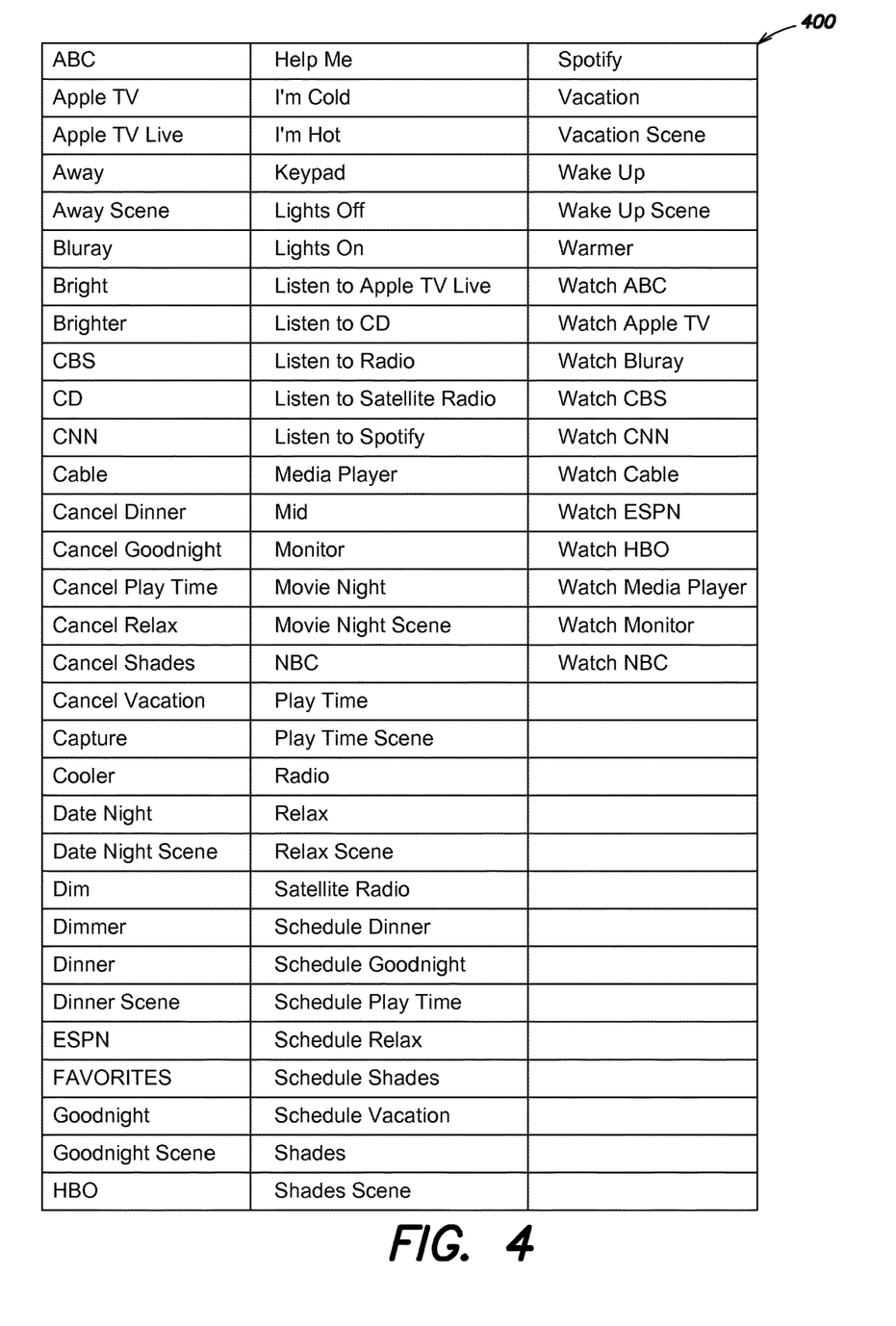
FIG. 4 is an example listing of key phrases of an example list of intentions that may be dynamically built.

FIG. 4 is an example listing of key phrases 400 of an example list of intentions that may be dynamically built. The intentions can be categorized into several categories, including service intentions, scene intentions favorite intentions, command intentions and navigation intentions. Service intentions may be scoped to a room, including keywords paired with actions that affect a service in the room. The key phrase of service intentions may be formatted as "Service", where the name of the service is provided alone (e.g., "Apple TV", "Blueray", "Cable", etc.) or as "Watch Service", where the name of the service is preceded by the command "Watch" (e.g., "Watch Apple TV", "Watch Blueray", "Watch Cable", etc.). These key phrases may be associated with actions that activate an audio/video version of the service. The key phrase of service intentions may also be formatted as "Listen to Service", where the name of the service is preceded by the command "Listen to" (e.g., "Listen to Apple TV Live", "Listen to CD", "Listen to Radio", etc.). These key phrases may be associated with actions that activate an audio only version of the service (if available).

Scene intentions may include keywords paired with actions that activate, schedule or unscheduled a scene for a current user. Scene intentions may be scoped to a current user, including keywords paired with actions that affect a scene associated with the user. The key phrase of scene intentions may be formatted as "Scene", where the name of scene is provided alone (e.g., "Dinner", "Goodnight", "Play Time", etc.). These key phrases may be associated with actions that activate a scene. The key phrase of scene intentions may also be formatted as "Schedule Scene", where the name of the scene is preceded by the command "Schedule" (e.g., "Schedule Dinner", "Schedule Goodnight", "Schedule Play Time", etc.). These key phrases may be associated with actions that activate the scene's schedule if it has been configured. Further, the key phrase of scene intentions may also be formatted as "Unschedule Scene", where the name of the scene is preceded by the command "Unschedule". These key phrases may be associated with actions that deactivate a scene's schedule if active.

Favorite intentions may include keywords paired with actions that present one or more types of media content selected by a current user. Favorite intentions may be scoped to both a current user and a room, including keywords paired with actions that affect media content present in the room and associated with the user. The actions of favorite intentions may first activate a service, and then set a channel or select a media file or stream used with that service. The key phrase of favorite intentions may be formatted as "Service", where the name of service is provided alone (e.g., "ABC", "CBS", "CNN" etc.) or "Watch Service", where the name of the service is preceded by the command "Watch" (e.g., "Watch ABC", "Watch CBS", "Watch CNN" etc.). These key phrases may be associated with actions that activate an audio/video version of the service set to the corresponding channel (or using a corresponding media file or stream). The key phrase of favorite intentions may also be formatted as "Listen to Service", where the name of the service is preceded by the command "Listen to". These key phrases may be associated with actions that activate an audio only version of the service (if available) set to the corresponding channel (or using a corresponding media file or stream).

Command intentions may include keywords paired with actions that send out a single command that may be related to a current state of the home automation system (i.e. a context). Command intentions may be scoped to a room. The key phrase of command intentions may be from a predefined list of commands, for example, including key phrases such as "Brighter" or "Dimmer" that are paired with actions that increase or decrease light level in the room, or, for example, including key phrases such as "I'm Hot" or "I'm Cold" that are paired with actions that decrease or increase temperature in the room.

Navigation intentions may include keywords paired with actions that provide navigation shortcuts in a home automation control UI. Navigation intentions may vary in scope, some being global while others depending on an active service or room. An example navigation intention may include the key phrase "Keypad" paired with an action to switch to a keypad screen of a currently active service (if available) in the home automation control UI. Another example navigation intention may include the key phrase "Capture" paired with an action to switch to a scene capture screen in the home automation control UI.

It should be understood that a wide variety of other types of intentions may be provided in the home automation system.

History-Based Key Phrase Suggestions

The history database 132 and the list of intentions 320 may be leveraged to produce key phrase suggestions that are likely useful to the user given the user's historical usage pattern. These history-based key phrase suggestions may be displayed in a voice control UI on the remote control 140 or mobile device 160 to prompt the user regarding speech input that may produce a desired result.

Figure 5:
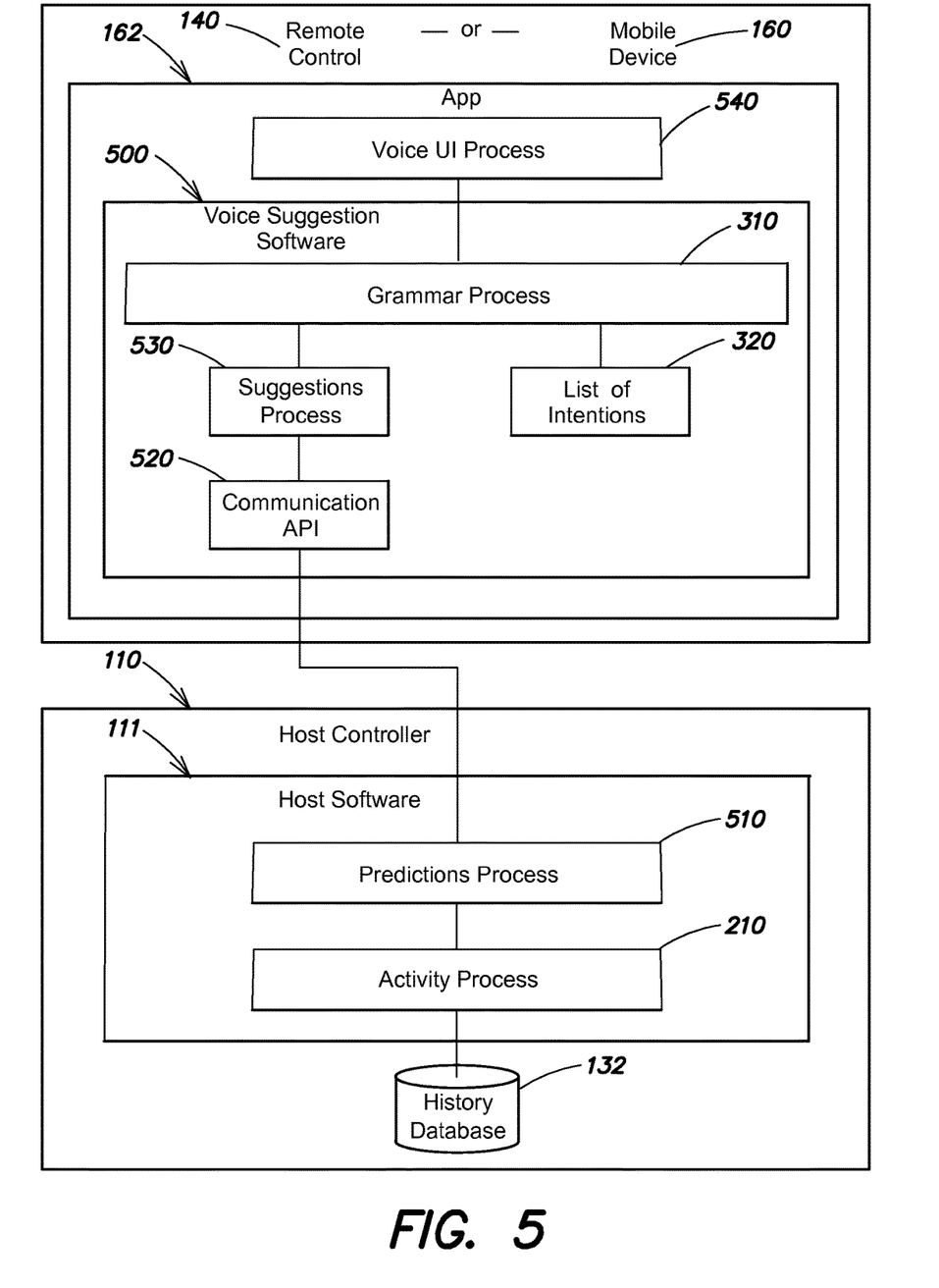
FIG. 5 is a block diagram of example voice suggestion software of an app and a predictions process of host software.

FIG. 5 is a block diagram of example voice suggestion software 500 of an app 162 and a predictions process 510 of host software 111. Initially, the predictions process 510 may issue one or more requests to the activity process 210 to determine (based on the history database 132) a frequency of various types of events when the home automation system was in a condition similar to its present condition. Such similarity may be based on time (e.g., both time of day and day of week), such that the requests seek the frequency of events on a same day of the week as the present day of week, in a time window that encompasses a present time of day on any day of the week, in a time window that encompasses the present time of day on a same day of the week, or based on some other time-related criteria. The predictions process 510 may apply scoring to the results returned in response to the requests. The scoring may be based on frequency, as well as length of the time window used in selecting the events, with a shorter time window causing a higher score than a longer time window. Further the scoring may be adjusted based on type of event, with types of events indicating more specific user action receiving higher scores than events indicating less specific user action. The scored results may then be provided as a prediction dataset to the voice suggestion software 500 on the remote control 140 or mobile device 160.

The voice suggestion software 500 may include a communication API 520 used to interface with the host controller 110, which passes the prediction dataset to a suggestions process 530. The suggestions process 530 takes the prediction dataset and processes it into a form useful to the grammar process 310, e.g., selecting a predetermined number of most frequent events. Such processing may transform the prediction dataset into a form that can be readily associated with intentions from a list of intentions 320. The processed prediction dataset and list of intentions 320 are provided to the grammar process 310 which associates events from the prediction data set with intentions from the list 320, to select intentions. At least the key phrases from such selected intentions are then provided to a voice UI process 540. The voice UI process 540 displays the key phrases of the selected intentions as key phrase suggestions in a voice control UI on a display screen of the remote control 140 or mobile device 160.

Figure 6:
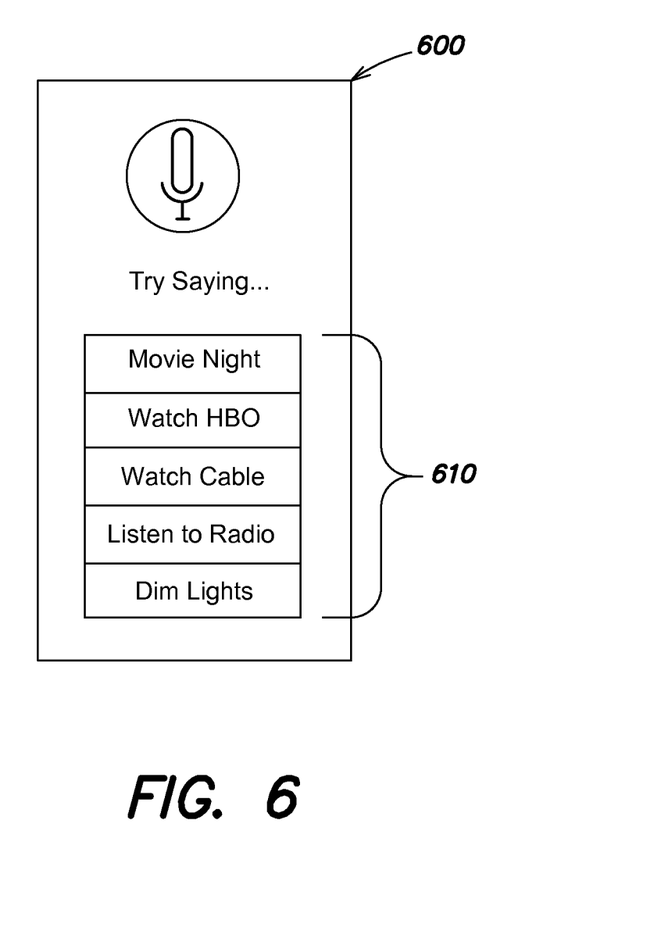
FIG. 6 is a screen shot of an example voice control UI that may be displayed on a remote control or mobile device.

FIG. 6 is a screen shot of an example voice control UI 600 that may be displayed on the remote control 140 or mobile device 160. Key phrase suggestions 610 may be displayed in a listing in connection with a prompt to the user to try them as speech input. In some implementations, the voice control UI 600 may be displayed on a touch screen of the remote control 140 or mobile device 160, and the key phrase suggestions may also serve as selectable buttons. Touch upon a button may be considered equivalent to speaking the key phrase, and trigger the corresponding action of the intention.

Recap and Conclusions

Figure 7:
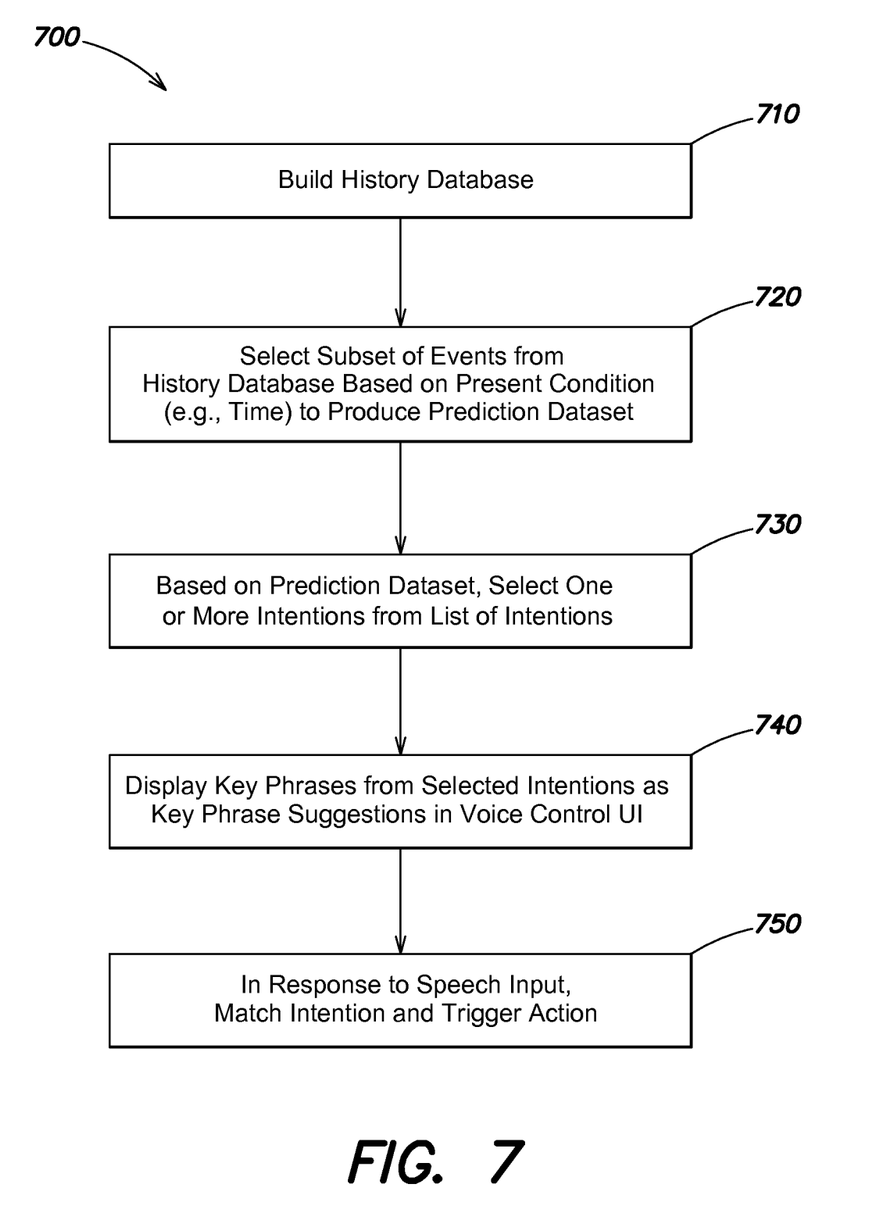
FIG. 7 is a flow diagram of a sequence of steps that may be implemented to provide history-based key phrase suggestions.

FIG. 7 is a flow diagram of a sequence of steps that may be implemented to provide history-based key phrase suggestions. The sequence of steps 700 provides a high-level recap of various operations discussed above, yet omits certain details to better illustrate the overall flow of operations. At step 710, the host activity recording software 200 on the host controller 110 (specifically, the history recorder 270 working together with the activity process 210 and message router process 220) may build the history database 132 that maintains events that have occurred. Each event may, for example, indicate one or more services activated, one or more scenes activated or one or more types of media content presented. At step 720, the predictions process 510 on the host controller 110 (working together with the activity process 210), may select a subset of the events of the history database 132 based on a present condition of the home automation system (e.g., time) to produce a predication dataset. At step 730, the voice suggestion software 500 on the remote control 140 or mobile device 160 (specifically, the suggestions process 530 and grammar process 310), based on the prediction dataset, may select one or more intentions from a list of intentions, wherein each intention includes a key phrase recognized by the voice recognition engine 300 paired with an action performed in response to the key phrase. At step 740, the voice suggestion software 500 (specifically, the voice UI process 540) may display a voice control UI 600 on a display screen of the remote control 140 or mobile device 160 that presents the key phrases from the one or more selected intentions as key phrase suggestions 610. Finally, at step 750, in response to speech input from the user, the voice recognition engine 300 on the remote control 140 or mobile device 160 (specifically, the recognizer process 360) may compare the speech input against the key phrases of the list of intentions to find a matching intention, and trigger the action associated with the matching intention.

It should be understood that various adaptations and modifications may be made to the above discussed sequence of steps and other portions of the above provided disclosure. While embodiments provided above involve a home automation system that includes a variety of different types of devices, such as lighting devices, security devices, A/V devices, electronic door locks, HVAC devices, etc., it should be remembered that the present techniques may be adapted for use with more limited types of home automation systems. For example, the techniques may be used with a home automation system that provides only lighting control (i.e., a lighting control system), a home automation system that provides only A/V control (i.e., an A/V control system), etc.

Further, while the disclosure provided above suggests various software processes may execute on particular devices (such as on host controller 110, remote control 140 or mobile device 160, etc.), it should be understood that software processes may be executed on different hardware devices, including on cloud-based hardware as part of cloud services 180.

Additionally, while it is described above that the history-based key phrase suggestions may be based on a history of events that have occurred in the home automation system itself, it should be understood that events that have occurred in other home automation systems may also be considered. For example, cloud services 180 may aggregate events from a plurality of home automation systems and a prediction algorithm may be applied to this combined event set to form key-phrase suggestions. By considering a larger user base, various usage patterns that may not be discernable in the events of a single home automation system may become statistically significant.

Further, it should be understood that at least some of the functionality suggested above to be implemented in software may be implemented in hardware. In general functionality may be implemented in software, hardware or various combinations thereof. Software implementations may include electronic device-executable instructions (e.g., computer-executable instructions) stored in a non-transitory electronic device-readable medium (e.g., a non-transitory computer-readable medium), such as a volatile or persistent memory, a hard-disk, a compact disk (CD), or other tangible medium. Hardware implementations may include logic circuits, application specific integrated circuits, and/or other types of hardware components. Further, combined software/hardware implementations may include both electronic device-executable instructions stored in a non-transitory electronic device-readable medium, as well as one or more hardware components, for example, processors, memories, etc. Above all, it should be understood that the above embodiments are meant to be taken only by way of example.

What is claimed is:

1. A method comprising:
    building a history database on a storage device that maintains events that have occurred in a home automation system, each event associated with a time and indicating one or more services activated, one or more scenes activated or one or more types of media content presented by the home automation system;
    selecting a subset of the events of the history database based on a comparison of each event and associated time with a present condition of the home automation system and a present time, to produce a scored prediction dataset, wherein event scores in the scored prediction dataset are determined at least in part based on a frequency of each event within a time window, with a shorter time window causing a higher score than a longer time window;
    selecting one or more intentions from a list of intentions based on the event scores from the scored prediction dataset, wherein each intention from the list is recognized by a voice recognition engine and includes a key phrase paired with an action to be performed by the home automation system;
    displaying, to a current user of a remote control or mobile device of the home automation system in a user interface on the remote control or mobile device, one or more key phrases from the one or more selected intentions as one or more key phrase suggestions;
    receiving, at the voice recognition engine, speech input of the current user from a microphone of the remote control or mobile device;
    comparing, by the voice recognition engine, the speech input against the key phrases of the list of intentions to find a matching intention; and
    triggering the action associated with the matching intention, wherein the action controls one or more devices within a room of the home automation system.

2. The method of claim 1, wherein the present time includes a present time of day and a present day of week and the comparison determines events in the history database that occurred on a same day of the week as the present day of week, in a time window that encompasses the present time of day on any day of the week, or in a time window that encompasses the present time of day on a same day of the week as the present day of the week.

3. The method of claim 1, wherein the scoring is adjusted by a factor based on the type of event, with types of events indicating more specific user action receiving higher scores than events indicating less specific user action.

4. The method of claim 1, further comprising: dynamically generating the list of intentions based upon at least one of configuration information for the home automation system, user content defined in the home automation system or a system state of the home automation system.

5. The method of claim 1, further comprising: dynamically generating the list of intentions based upon the current user or a room being controlled.

6. The method of claim 1, further comprising: storing the history database on a host controller that is in communication with the remote control or mobile device over a network.

7. The method of claim 1, wherein the list of intentions includes one or more service intentions whose action when performed activates one or more services within a room.

8. The method of claim 1, wherein the list of intentions includes one or more scenes intentions whose action when performed activates one or more scenes.

9. The method of claim 1, wherein the action is a system action that activates one or more services or activates one or more scenes, in the home automation system.

10. The method of claim 1, wherein the action is a user interface (UI) action that controls one or more aspects of a home automation system control UI.

11. A home automation system comprising:
a host controller that is coupled to and configured to control one or more audio/video (A/V) devices, lighting devices, heating ventilation and cooling (HVAC) devices or security devices within a structure to provide home automation, the host controller including:
host activity recording software stored on the host controller that is configured to build a history database that maintains events that have occurred in the structure, each event indicating one or more services activated, one or more scenes activated or one or more types of media content presented, and
a predictions software process stored on the host controller that is configured to select a subset of the events of the history database based on a present condition of the home automation system and a frequency of each event within a time window to produce a scored prediction dataset that scores each event based at least in part on the time window, with a shorter time window causing a higher score than a longer time window; and
a remote control or mobile device in communication with the host controller over a network, the remote control or mobile device including:
a voice recognition engine stored on the remote control or mobile device, and
voice suggestion software stored on the remote control or mobile device and configured to
select one or more intentions from a list of intentions based on the event scores of the scored prediction dataset wherein each intention from the list is recognized by the voice recognition engine and includes a key phrase paired with an action to be performed by the home automation system, and
display on a screen of the remote control or mobile device to a current user of the home automation system one or more key phrases from the one or more selected intentions as one or more key phrase suggestions, wherein the voice recognition engine includes a recognizer process that is configured to receive speech input of the current user from a microphone of the remote control or mobile device, compare the speech input against the key phrases of the list of intentions to find a matching intention, and trigger the action associated with the matching intention and wherein the action controls one or more devices within a room of the home automation system.

12. The home automation system of claim 11, wherein each event in the history of events includes at least an indication of a time associated with the event, the present condition of the home automation system includes a present time, and the selection is based on a comparison of the time of each event with the present time.

13. The home automation system of claim 11, wherein the voice suggestion software includes a grammar process that is configured to dynamically generate the list of intentions based upon at least one of configuration information for the home automation system, user content defined in the home automation system or a system state of the home automation system.

14. The home automation system of claim 11, wherein the voice suggestion software includes a grammar process that is configured to dynamically generate the list of intentions based upon the current user or a room being controlled.

15. A non-transitory electronic-device readable medium storing software that when executed on one or more processors is operable to:
receive a scored prediction dataset that includes a frequency of events that occurred in a home automation system within a time window that prior to a present time, each event indicating one or more services activated, one or more scenes activated or one or more types of media content presented by the home automation system, wherein each event is scored, and a shorter time window causes a higher score than a longer time window;
select one or more key phrases from a list of key phrases used by a voice recognition engine of the home automation system based on the event scores;
display the selected one or more key phases on a remote control or mobile device of the home automation system to a user as one or more key phrase suggestions;
receive speech input by the remote control or mobile device from the user corresponding to one of the one or more key phrase selections;
compare the speech input against the list of key phrases used by the voice recognition engine to find a match; and
trigger an action associated with the matching key phrase, wherein the action controls one or more devices within a room of the home automation system.

16. The non-transitory electronic-device readable medium of claim 15, wherein the list of key phrases is part of a list of intentions, with each intention pairing a key phrase and an action performed in response to the key phrase, and the selection of one or more key phrases includes the selection of one or more intentions.

17. The non-transitory electronic-device readable medium of claim 15, wherein the software when executed on the one or more processors is further operable to: dynamically generate the list of intentions based upon at least one of configuration information for the home automation system, user content defined in the home automation system or a system state of the home automation system.

18. The non-transitory electronic-device readable medium of claim 15, wherein the software when executed on the one or more processors is further operable to: dynamically generate the list of intentions based upon the current user or a room being controlled.

* * * * *